(12) United States Patent
Yabuki et al.

(10) Patent No.: US 9,977,302 B2
(45) Date of Patent: May 22, 2018

(54) DISPLAY DEVICE COMPRISING A FIRST COMMON WIRING PORTION HAVING A WIDTH LARGER THAN A WIDTH OF A SECOND COMMON WIRING PORTION

(71) Applicant: Panasonic Liquid Crystal Display Co., Ltd., Himeji-shi, Hyogo (JP)

(72) Inventors: Hiroyuki Yabuki, Hyogo (JP); Tomohiro Nakayama, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 14 days.

(21) Appl. No.: 15/347,315

(22) Filed: Nov. 9, 2016

(65) Prior Publication Data

US 2017/0131606 A1    May 11, 2017

(30) Foreign Application Priority Data

Nov. 10, 2015   (JP) ................. 2015-220752

(51) Int. Cl.
| | |
|---|---|
| *G02F 1/1362* | (2006.01) |
| *G02F 1/1333* | (2006.01) |
| *G02F 1/1343* | (2006.01) |
| *G02F 1/1345* | (2006.01) |
| *G02F 1/1368* | (2006.01) |

(52) U.S. Cl.
CPC ...... *G02F 1/136286* (2013.01); *G02F 1/1345* (2013.01); *G02F 1/133345* (2013.01); *G02F 1/134336* (2013.01); *G02F 1/1368* (2013.01); *G02F 2001/133388* (2013.01); *G02F 2201/121* (2013.01); *G02F 2201/123* (2013.01)

(58) Field of Classification Search
CPC .............. G02F 2201/121; G02F 2001/133388
See application file for complete search history.

(56) References Cited

U.S. PATENT DOCUMENTS

| | | | |
|---|---|---|---|
| 2010/0110057 A1* | 5/2010 | Lee ................... | G02F 1/134309 345/211 |
| 2010/0110359 A1* | 5/2010 | Lee ...................... | G02F 1/1345 349/149 |

(Continued)

FOREIGN PATENT DOCUMENTS

JP    2005-157404    6/2005

*Primary Examiner* — Paul Lee

(74) *Attorney, Agent, or Firm* — Hamre, Schumann, Mueller & Larson, P.C.

(57) ABSTRACT

A display device includes a gate lines extending in a first direction, data lines extending in a second direction, pixel electrodes, a common electrode disposed to face the pixel electrodes, common wirings that are electrically connected to the common electrode; and a common bus line that extends in the first direction outside of a display region and is electrically connected to the common wirings. Each of the common wiring includes a first common wiring portion extending in the first direction and a second common wiring portion that is connected to the first common wiring portion and extends in the second direction outside of the display region. A width of the first common wiring portion in the first direction is larger than a width of the second common wiring portion in the first direction. Both ends of the first common wiring portion in the first direction are electrically connected to the common bus line.

10 Claims, 9 Drawing Sheets

(56) References Cited

U.S. PATENT DOCUMENTS

| | | | | |
|---|---|---|---|---|
| 2010/0309421 | A1* | 12/2010 | Gotoh | G02F 1/136259 349/152 |
| 2013/0155366 | A1* | 6/2013 | Morita | G02F 1/134336 349/143 |
| 2013/0335690 | A1* | 12/2013 | Fujiwara | G02F 1/1339 349/153 |
| 2014/0104149 | A1* | 4/2014 | Lee | G02F 1/13306 345/92 |
| 2014/0300852 | A1* | 10/2014 | Yoshida | G02F 1/1339 349/143 |
| 2014/0354928 | A1* | 12/2014 | Kobayashi | G02F 1/1339 349/113 |

* cited by examiner

DISPLAY DEVICE COMPRISING A FIRST COMMON WIRING PORTION HAVING A WIDTH LARGER THAN A WIDTH OF A SECOND COMMON WIRING PORTION

CROSS-REFERENCE TO RELATED APPLICATION

The present application claims priority from Japanese application JP 2015-220752 filed on Nov. 10, 2015, the content of which is hereby incorporated by reference into this application.

TECHNICAL FIELD

The present disclosure relates to a display device.

BACKGROUND

Among various display devices, a liquid crystal display device, for example, drives liquid crystal by applying thereto an electric field generated between a pixel electrode and a common electrode (also referred to as a counter electrode), which are formed in each pixel region, to adjust an amount of light transmitted through a region between the pixel electrode and the common electrode, thereby displaying an image. A common voltage (Vcom) is supplied to the common electrode from an external circuit through a common bus line. Conventionally, there has been proposed a configuration in which, in the liquid crystal display device in a prior art, a plurality of common wirings is provided in a display region in order to stably supply the common voltage to the common electrode (for example, see Japanese Unexamined Patent Application Publication 2005-157404).

In the liquid crystal display device disclosed in the prior art, a common bus line is provided on one side surface of a display panel, and a plurality of common wirings (counter voltage signal lines) extending in the direction same as the direction in which a gate line extends is connected to the common bus line. The common voltage supplied to the common bus line from the external circuit is then supplied to the common electrodes through the common wirings.

However, the conventional liquid crystal display device has a problem such that efficiency of supplying the common voltage to the common electrodes is low due to the influence of resistance of the common bus line. The low efficiency of supplying the common voltage entails deterioration of display quality.

SUMMARY

An object of the present disclosure is to provide a display device that can increase efficiency of supplying a common voltage to a common electrode by lowering resistance of a common bus line.

In one general aspect, the instant application describes a display device includes a plurality of gate lines extending in a first direction, a plurality of data lines extending in a second direction, a plurality of pixel electrodes disposed so as to correspond to each of a plurality of pixel regions arrayed in the first direction and the second direction, a common electrode disposed to face the plurality of pixel electrodes; a plurality of common wirings that is electrically connected to the common electrode to supply a common voltage to the common electrode; and a common bus line that extends in the first direction outside of a display region and is electrically connected to the plurality of common wirings. Each of the common wirings includes, outside of the display region, a first common wiring portion extending in the first direction and a second common wiring portion that is connected to the first common wiring portion and extends in the second direction. A width of the first common wiring portion in the first direction is larger than a width of the second common wiring portion in the first direction. Both ends of the first common wiring portion in the first direction are electrically connected to the common bus line.

The above general aspect may include one or more of the following features.

Each of the common wirings may be disposed between the two data lines adjacent to each other, and is formed on the same layer as the plurality of data lines.

The first common wiring portion may overlap the common bus line in a planar view.

The first common wiring portion may be formed on a first insulating film covering the common bus line, the first common wiring portion being electrically connected to the common bus line through a contact hole formed on the first insulating film.

The display device may further include a connection wiring which extends in the first direction outside of the display region and overlaps the common bus line in a planar view, wherein The first common wiring portion may overlap the common bus line in a planar view, the first common wiring portion may be formed on a first insulating film covering the common bus line, the connection wiring may be formed on a second insulating film covering the first common wiring portion. The connection wiring may be electrically connected to the common bus line through a first contact hole formed in the first insulating film and the second insulating film, the first insulating film and the second insulating film being located between the data line and the first common wiring portion adjacent to each other, and the connection wiring may be electrically connected to the first common wiring portion through a second contact hole formed on the second insulating film, the second contact hole overlapping at least one of the both ends of the first common wiring portion. The first common wiring portion and the common bus line may be electrically connected to each other through the connection wiring.

The common bus line may be formed on the same layer as the plurality of gate lines.

A width of the first common wiring portion in the first direction may be larger than a width of each of the pixel regions in the first direction.

A width of the first common wiring portion in the first direction may be larger, as a distance from a feeding portion of the common voltage to the first common wiring portion is longer.

One of the pixel regions may be a region surrounded by the two gate lines adjacent to each other, and the data line and the common wiring which are adjacent to each other.

The data line or the common wiring may be disposed between the two pixel regions adjacent to each other in the first direction, and the plurality of data lines and the plurality of common wirings may be alternately disposed in the first direction. The two gate lines may be disposed between the two pixel regions which are adjacent to each other in the second direction.

DETAILED DESCRIPTION

Hereinafter, an exemplary embodiment of the present disclosure will be described with reference to the drawings. While the exemplary embodiments below describe a liquid crystal display device as one example, the display device according to the present disclosure is not limited to a liquid crystal display device, and may be an organic EL display device, for example.

Figure 1:
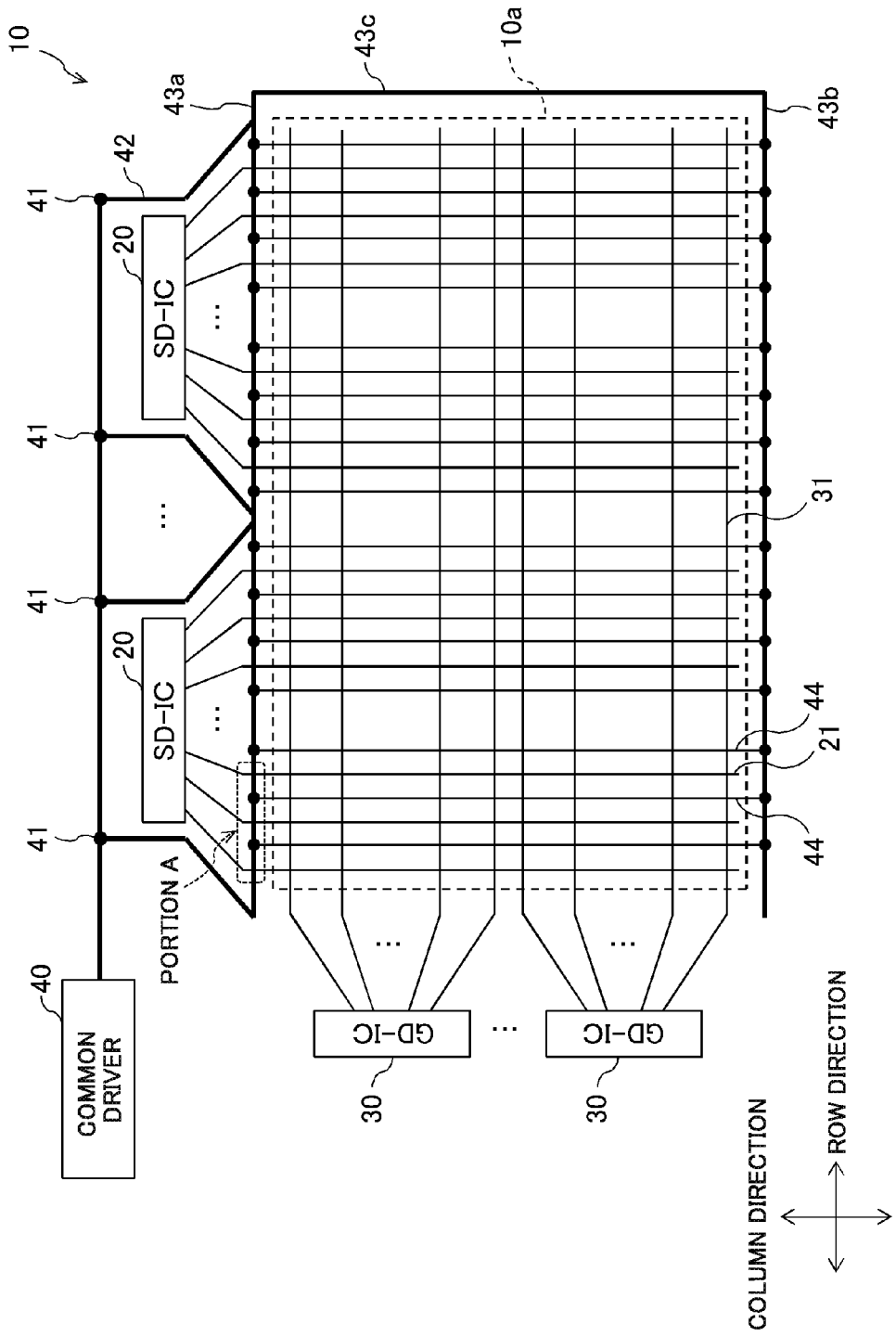
FIG. 1 is a plan view illustrating a schematic configuration of a liquid crystal display device according to an exemplary embodiment of the present disclosure.

FIG. 1 is a plan view illustrating a schematic configuration of a liquid crystal display device according to an exemplary embodiment of the present disclosure. The liquid crystal display device includes a display panel 10, a plurality of source driver ICs 20, a plurality of gate driver ICs 30, a common driver 40, a control circuit (not illustrated), and a backlight device (not illustrated). There is no limitation to the numbers of source driver ICs 20 and gate driver ICs 30. The display panel 10 includes a display region 10a and a frame region around (outside of) the display region 10a.

A plurality of gate lines 31 extending in a row direction (a first direction), a plurality of data lines 21 extending in a column direction (a second direction), and a plurality of common wirings 44 extending in the column direction are disposed in the display region 10a. The data lines 21 and the common wirings 44 are alternately disposed at regular intervals in the row direction.

The frame region is provided with the source driver ICs 20, the gate driver ICs 30, the common driver 40, and the control circuit (not illustrated). These circuits may be mounted on the display panel, or may be mounted on a circuit board provided outside of the display panel. A plurality of the data lines 21 is electrically connected to each of the source driver ICs 20. A plurality of the gate lines 31 is electrically connected to each of the gate driver ICs.

The common driver 40 generates a common voltage Vcom, and supplies the generated common voltage Vcom to a plurality of feeding sections 41. The feeding sections 41 may be composed of terminals provided on the display panel 10. A feed line 42 is connected to each of the feeding sections 41, and each feed line 42 is electrically connected to a common bus line 43 (common bus lines 43a and 43b). In the frame region, the common bus line 43a extends in the row direction along a first side (upper side in FIG. 1) of the display region 10a, and the common bus line 43b extends in the row direction along a second side (lower side in FIG. 1) facing the first side. The common bus line 43a and the common bus line 43b are electrically connected to each other through a relay wiring 43c formed on the same or different layer of the common bus lines 43a and 43b and disposed along a third side (right side in FIG. 1) of the display region 10a. The common bus line 43 may be composed of a single common bus line 43a.

Each of the common wirings 44 is disposed such that one end of each common wiring 44 is electrically connected to the common bus line 43a on the first side and the other end of each common wiring 44 is electrically connected to the common bus line 43b at the second side. Thus, the common voltage Vcom output from the common driver 40 is supplied to each common wiring 44 through the common bus lines 43a and 43b.

Figure 2:
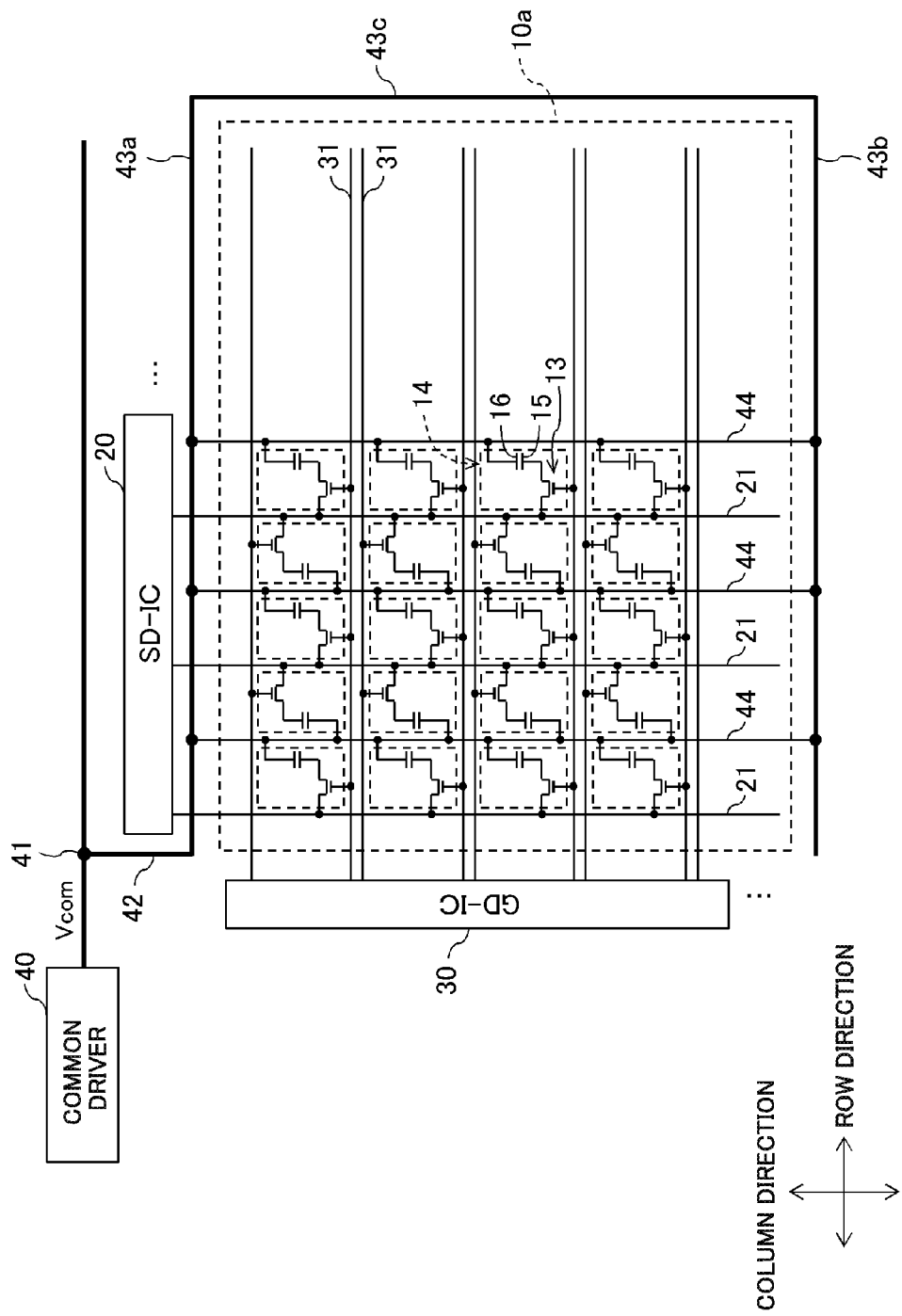
FIG. 2 is a plan view illustrating a detail configuration of the liquid display region according to an exemplary embodiment of the present disclosure.

FIG. 2 is a plan view illustrating a detail configuration of the display region 10a. In the display region 10a, pixel regions 14, each of which is surrounded by two adjacent gate lines 31, and a single data line 21 and a single common wiring 44 which are adjacent to each other, are arrayed into a matrix shape in row and column directions. The data line 21 or the common wiring 44 is disposed between two pixel regions 14 adjacent to each other in the row direction, and the data lines 21 and the common wirings 44 are alternately disposed at regular intervals in the row direction. Two gate lines 31 are disposed between two pixel regions 14 adjacent to each other in the column direction.

A pixel electrode 15 and a common electrode 16 are formed in each pixel region 14. A thin film transistor 13 is formed near an intersection portion of a gate line 31 and a data line 21 in each pixel region 14. The thin film transistor 13 is formed such that a drain electrode is electrically connected to the data line 21, and a source electrode is electrically connected to the pixel electrode 15. The common electrode 16 is electrically connected to the common wiring 44. The common electrode 16 may be independently formed in each pixel region, or formed on the entire display region 10a in a solid pattern. Further, the common electrode 16 may be provided with a slit corresponding to each pixel region. The configuration of the pixel region 14 is not limited to the above-described configuration.

Active matrix display is performed in each pixel region 14. Specifically, a gate voltage is supplied to the gate line 31 from the gate driver IC 30, and a data voltage (gradation voltage) is supplied to the data line 21 from the source driver IC 20. The data voltage is supplied to the pixel electrode 15 through on/off of the thin film transistor 13 by the gate voltage. A liquid crystal is driven by an electric field generated by the difference between the data voltage supplied to the pixel electrode 15 and the common voltage Vcom supplied to the common electrode 16 from the common driver 40 to control transmittance of light in each pixel region 14, thereby displaying an image. The desired data voltages are applied to data lines 21 connected to the pixel electrodes 15 in the pixel regions 14, which are formed by striped color filters to correspond to red (R), green (G), and blue (B), thereby performing color display. A known method can be applied to a driving method for the liquid crystal display device described above. The common bus line 43 affects the efficiency of supplying the common voltage Vcom to the common electrode 16 due to resistance of the common bus line 43 (wiring resistance). For example, when the resistance of the common bus line 43 is high, the efficiency of supplying the common voltage Vcom is lowered, which entails deterioration in display quality. To prevent such deterioration in display quality, it is desirable to lower the resistance of the common bus line 43 to increase the efficiency of supplying the common voltage Vcom to the common electrode 16. The liquid crystal display device according to the present embodiment has a characteristic configuration by which the resistance of the common bus line 43 can be lowered. Hereinafter, the characteristic configuration will be specifically described.

Figure 3:
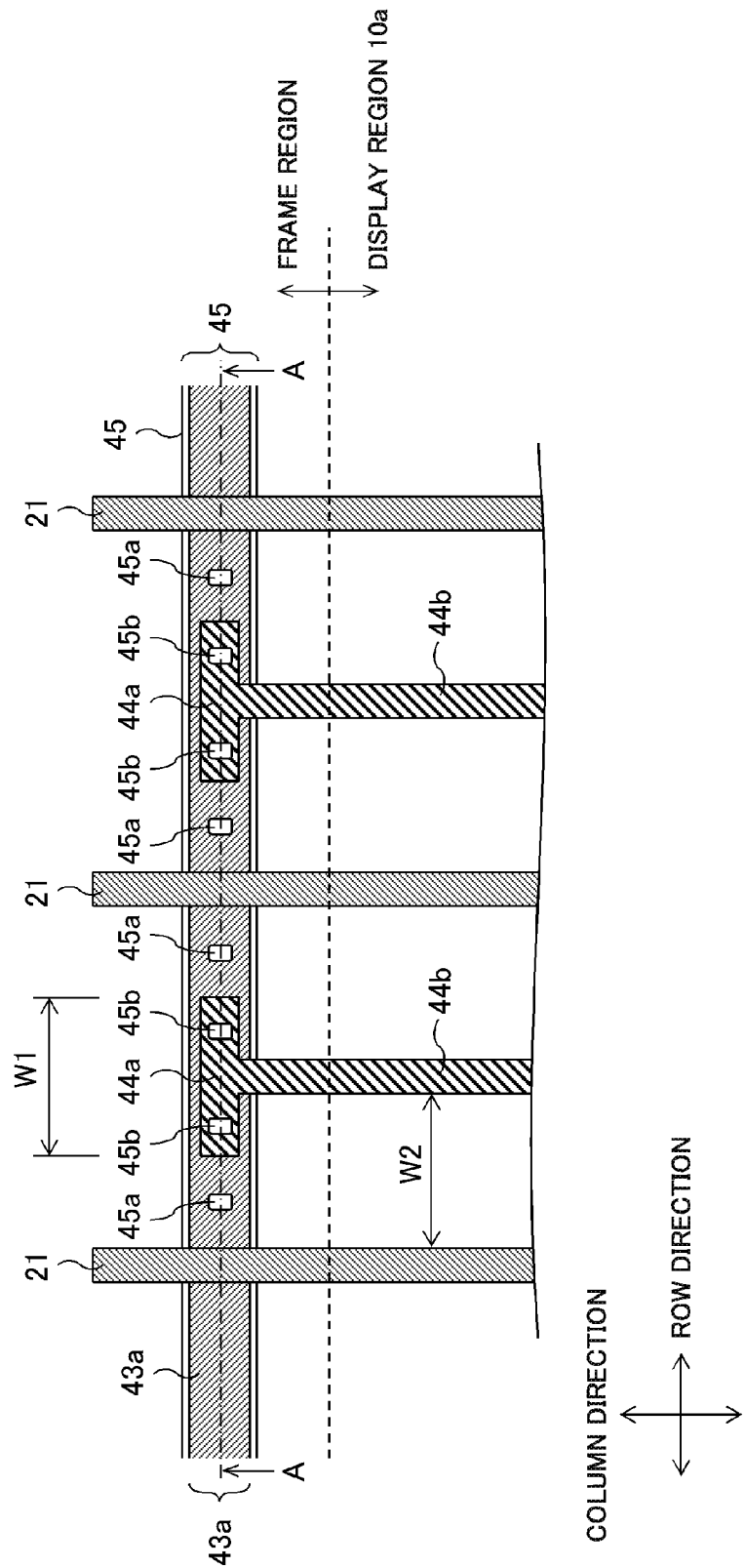
FIG. 3 is a plan view of an enlarged portion a in FIG. 1.
Figure 4:
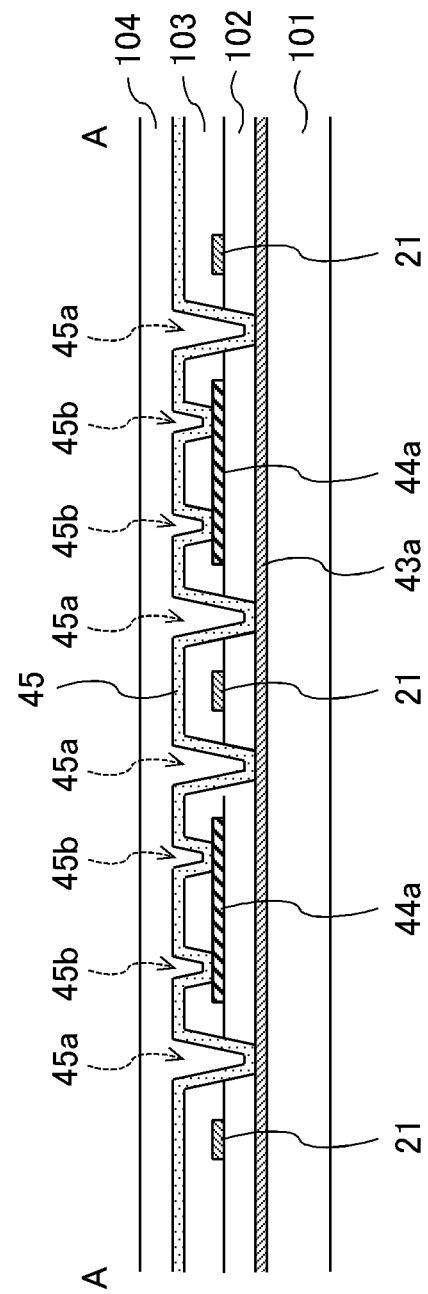
FIG. 4 is a sectional view taken along a line A-A in FIG. 3.

FIG. 3 is a plan view of an enlarged portion a in FIG. 1, and FIG. 4 is a sectional view taken along a line A-A in FIG. 3. The common bus line 43 is formed on a glass substrate 101. The common bus line 43 is formed on the same layer as the gate lines 31. A first insulating film 102 (for example, gate insulating film) is formed to cover the common bus line 43. The data lines 21 and the common wirings 44 are formed on the first insulating film 102. The data lines 21 and the common wirings 44 are formed on the same layer.

Each of the common wirings 44 includes a first common wiring portion 44a extending in the row direction in the frame region and a second common wiring portion 44b connected to the first common wiring portion 44a and extending in the column direction. In addition, the width of the first common wiring portion 44a in the row direction is set larger than the width of the second common wiring portion 44b in the row direction. For example, the width W1 of the first common wiring portion 44a in the row direction is set larger than the width W2 of the pixel region 14 in the row direction. The width of the first common wiring portion 44a in the column direction may be the same as the width of the common bus line 43a in the column direction. The first common wiring portion 44a is disposed to overlap the common bus line 43a in a planar view. The second common wiring portion 44b is connected substantially to the center of the first common wiring portion 44a. The first common wiring portion 44a and the second common wiring portion 44b are formed on the same layer. Note that the first common wiring portion 44a may be formed on the first insulating film 102 and the second common wiring portion 44b may be formed on a different layer from the first common wiring portion 44a.

As illustrated in FIG. 4, a second insulating film 103 is formed to cover the data lines 21 and the common wirings 44. A connection wiring 45 made of ITO (Indium Tin Oxide) is formed on the second insulating film 103. The connection wiring 45 extends in the row direction in the frame region and is disposed to overlap the common bus line 43a in a planar view. A third insulating film 104 is formed so as to cover the connection wiring 45. A first contact hole 45a is formed on the first insulating film 102 and the second insulating film 103 which are located between the data line 21 and the first common wiring portion 44a which are adjacent to each other, and a second contact hole 45b is formed on the second insulating film 103 located above both ends of the first common wiring portion 44a. The connection wiring 45 is formed in the first contact hole 45a and the second contact hole 45b. Thus, the common bus line 43 and the common wiring 44 are electrically connected to each other through the connection wiring 45 formed in the first contact hole 45a and the second contact hole 45b.

Figure 5:
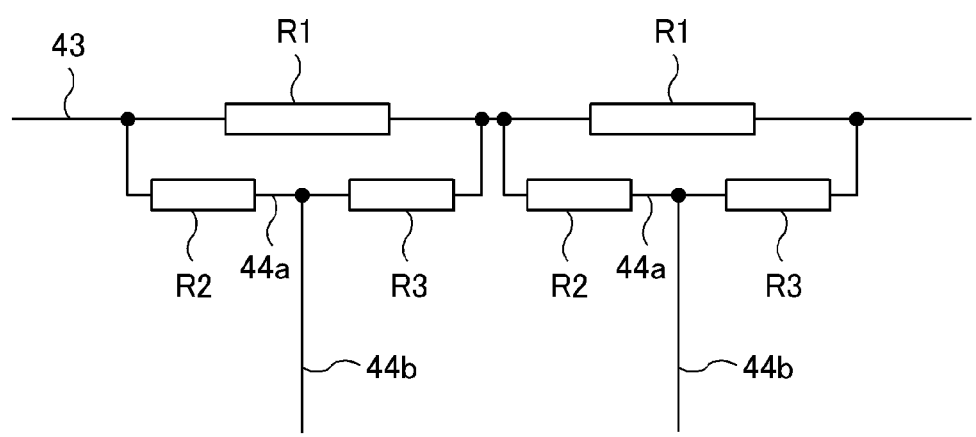
FIG. 5 is an equivalent circuit diagram illustrating common bus lines of the liquid display region according to an exemplary embodiment of the present disclosure.

As described above, each of the common wirings 44 has the configuration in which the first common wiring portion 44a is disposed parallel to the common bus line 43 and both ends of the first common wiring portion 44a are electrically connected to the common bus line 43. FIG. 5 is an equivalent circuit diagram illustrating the above configuration. As illustrated in FIG. 5, a resistor R1 corresponding to the common bus line 43 and two resistors R2 and R3, which correspond to the first common wiring portion 44a and are connected in series, are connected in parallel. This configuration can lower the resistance of the entire common bus line 43 as compared to the conventional configuration in which the common wiring 44 does not have the first common wiring portion 44a. Therefore, the efficiency of supplying the common voltage Vcom to the common electrode 16 can be enhanced.

A known configuration can be applied to the cross-sectional structure of each of the pixel regions 14. For example, the common electrode 16 may be formed on the glass substrate 101, or on the third insulating film 104. Alternatively, the common electrode 16 may be directly connected to the common wiring 44, or may be electrically connected through a contact hole formed in an insulating film.

Figure 6:
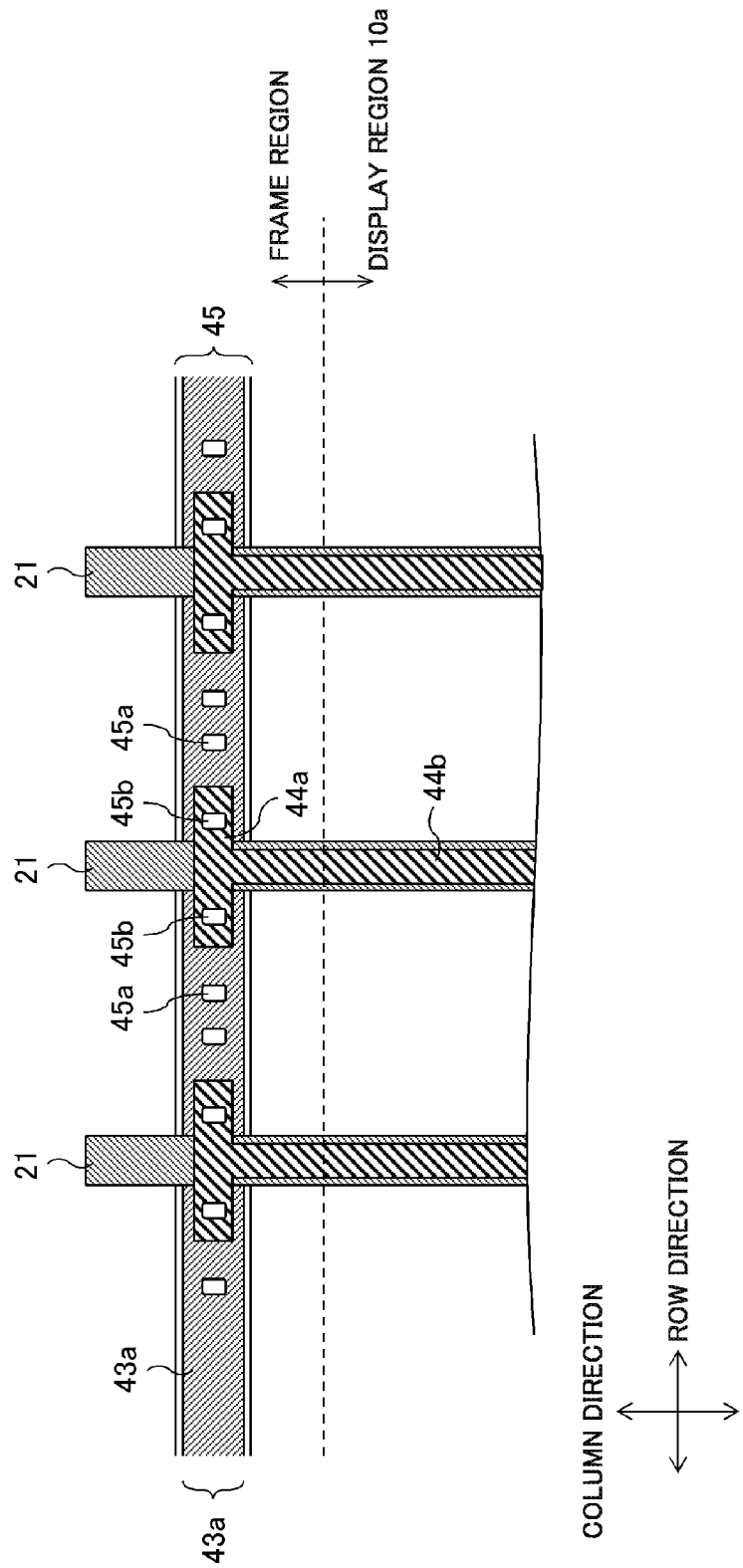
FIG. 6 is a plan view illustrating another configuration of common wirings according to an exemplary embodiment of the present disclosure.

The display device according to the present disclosure is not limited to the configuration described above. For example, the common wirings 44 may be disposed to overlap the data lines 21 in a planar view as illustrated in FIG. 6. In this case, a single data line 21 and a single common wiring 44 are disposed between two pixel regions 14 adjacent to each other in the row direction, and a single gate line 31 is disposed between two pixel regions 14 adjacent to each other in the column direction.

Further, an insulating film is formed between the common wiring 44 and the data line 21. In the configuration described above, the common wiring 44 may be disposed above or below the data line 21.

Figure 7:
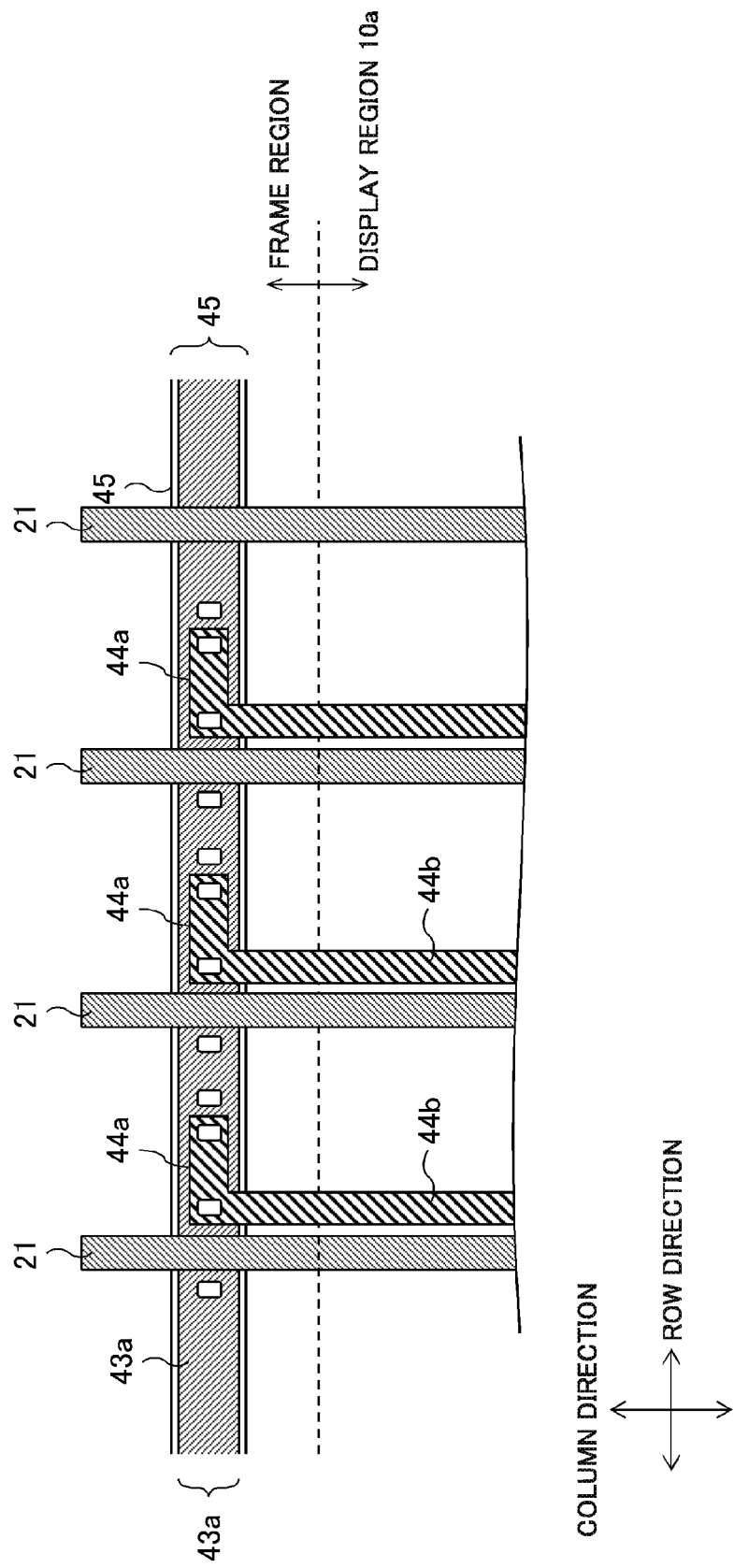
FIG. 7 is a plan view illustrating another configuration of common wirings according to an exemplary embodiment of the present disclosure.

Alternatively, each of the common wirings 44 may be disposed close to each of the data lines 21 in a planar view as illustrated in FIG. 7. In this case, a single data line 21 and a single common wiring 44 are disposed between two pixel regions 14 adjacent to each other in the row direction, and a single gate line 31 is disposed between two pixel regions 14 adjacent to each other in the column direction.

Figure 8:
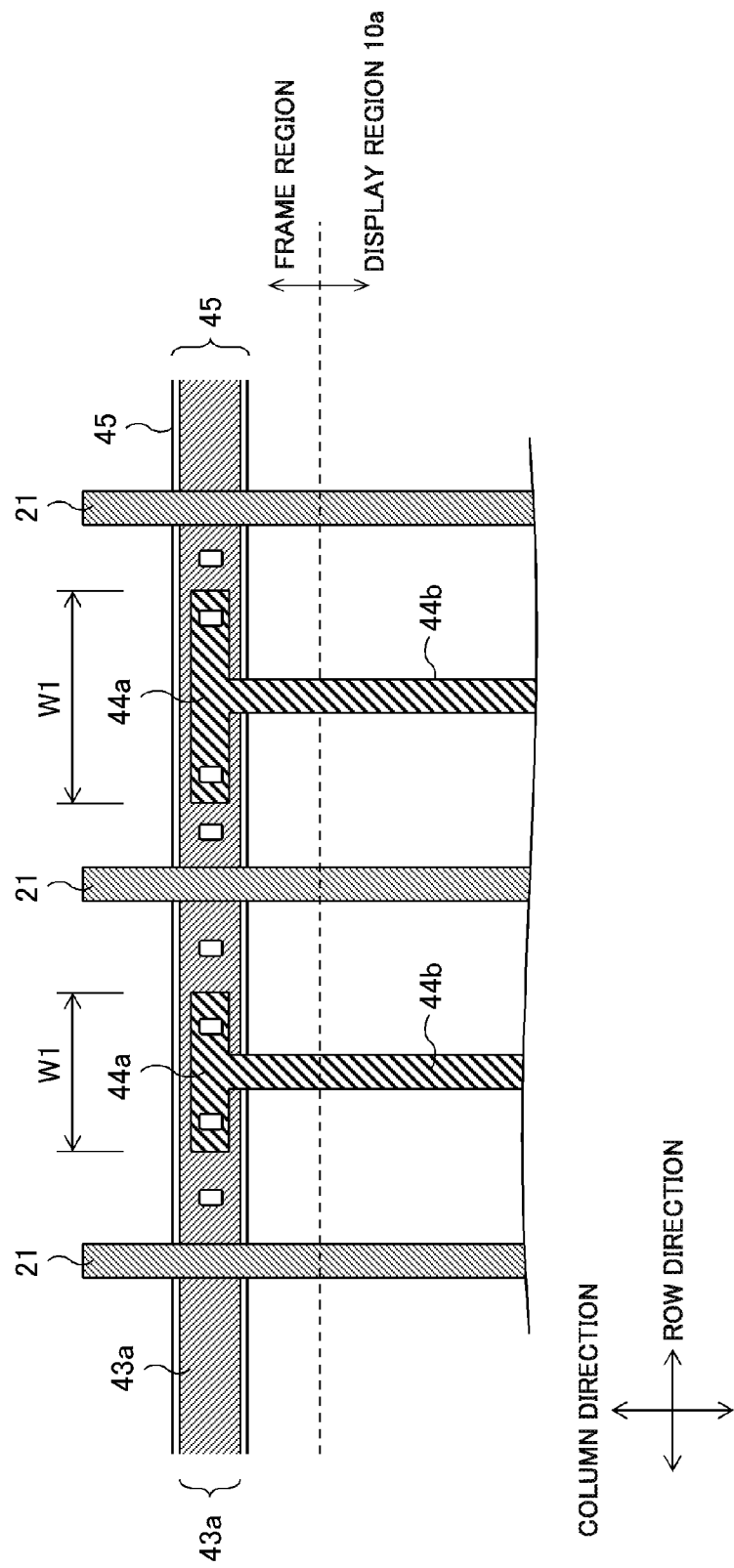
FIG. 8 is a plan view illustrating another configuration of common wirings according to an exemplary embodiment of the present disclosure.

Alternatively, the widths W1 of the first common wiring portions 44a of the common wirings 44 in the row direction may be the same or different from each other as illustrated in FIG. 8. For example, the widths W1 of the first common wiring portions 44a of the common wirings 44 in the row direction may be formed to be increased, as the distance from the feeding section 41 (see FIG. 1) for the common voltage to the first common wiring portion 44a is longer. With this, the efficiency of supplying the common voltage Vcom can be made uniform in the entire region of the common electrode 16.

Figure 9:
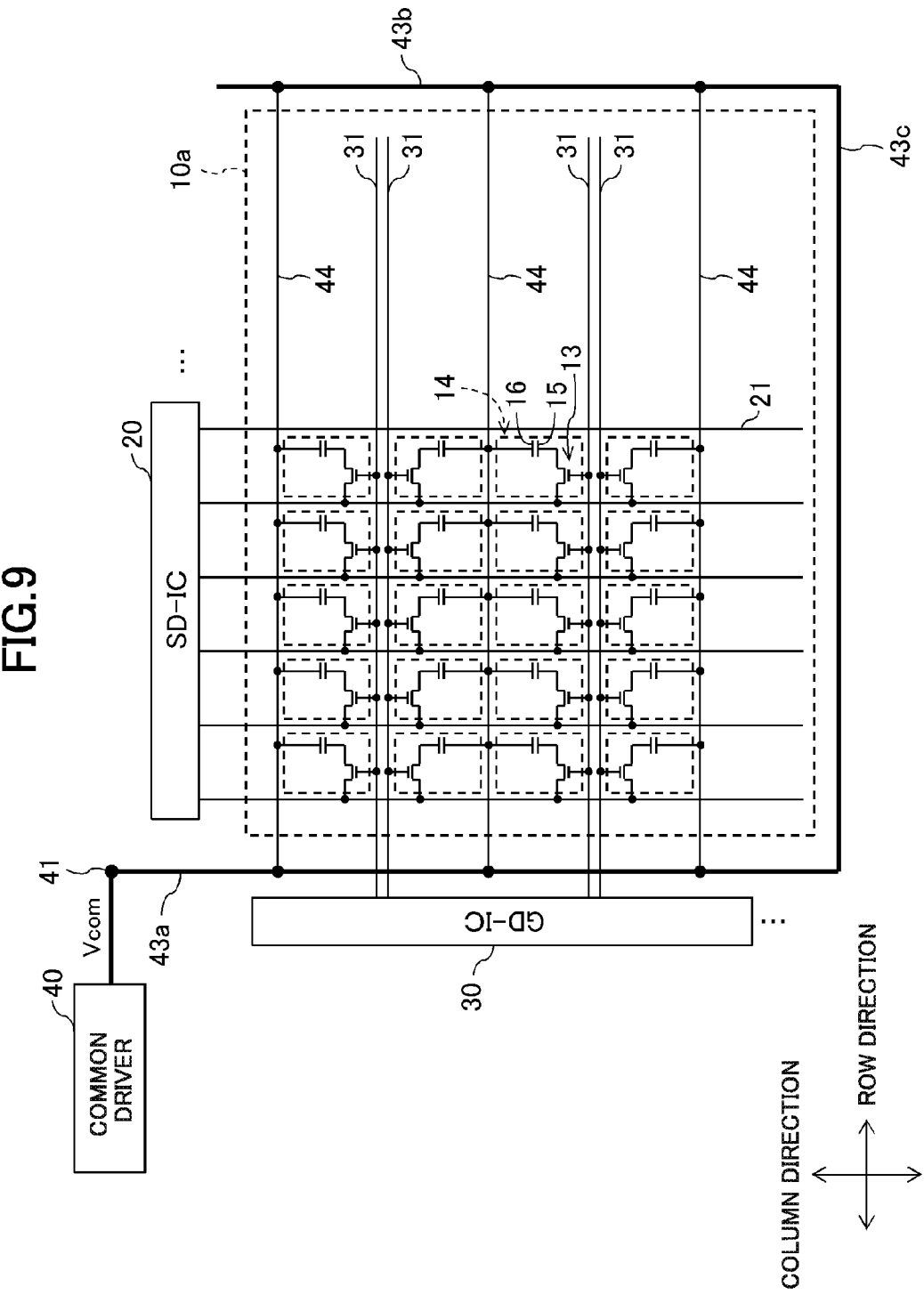
FIG. 9 is a plan view illustrating another configuration of a display panel according to an exemplary embodiment of the present disclosure.

In each of the above configurations, the common bus line 43 extends in the row direction along the first side (upper side in FIG. 1) of the display region 10a in the frame region, and each of the common wirings 44 extends in the column direction. However, the configuration of the display device according to the present disclosure is not limited thereto. For example, as illustrated in FIG. 9, the common bus line 43a may extend in the frame region in the column direction along the left side of the display region 10a, and the common wirings 44 may extend in the row direction. In this case, a single data line 21 is disposed between two pixel regions 14 adjacent to each other in the row direction, two gate lines 31 are disposed between the pixel regions 14 on the first row and the second row, and a single common wiring 44 is disposed between the pixel regions 14 on the second row and the third row. Further, each of the common wirings 44 may include a first common wiring portion 44a extending in the column direction in the frame region and a second common wiring portion 44b connected to the first common wiring portion 44a and extending in the row direction. The width of the first common wiring portion 44a in the column direction may be set larger than the width of the pixel region 14 in the column direction. In addition, in the above configuration, the common bus line 43 may be formed on the same layer as the data lines 21, and the common wirings 44 maybe formed on the same layer as the gate lines 31.

While the exemplary embodiments of the present invention have been described above, the present invention is not limited to the exemplary embodiments described above, and it is apparent that an embodiment modified by a person skilled in the art, as appropriate, from the exemplary embodiments described above within the scope not departing from the spirit of the present invention is included in the technical scope of the present invention.

What is claimed is:

1. A display device comprising:
   a plurality of gate lines extending in a first direction;
   a plurality of data lines extending in a second direction;
   a plurality of pixel electrodes disposed so as to correspond to each of a plurality of pixel regions arrayed in the first direction and the second direction;
   a common electrode disposed to face the plurality of pixel electrodes;
   a plurality of common wirings that is electrically connected to the common electrode to supply a common voltage to the common electrode; and
   a common bus line that extends in the first direction outside of a display region and is electrically connected to the plurality of common wirings,
   wherein each of the common wirings includes, outside of the display region, a first common wiring portion extending in the first direction and a second common wiring portion that is connected to the first common wiring portion and extends in the second direction,
   a width of the first common wiring portion in the first direction is larger than a width of the second common wiring portion in the first direction, and
   both ends of the first common wiring portion in the first direction are electrically connected to the common bus line.

2. The display device according to claim 1, wherein each of the common wirings is disposed between the two data lines adjacent to each other, and is formed on the same layer as the plurality of data lines.

3. The display device according to claim 1, wherein the first common wiring portion overlaps the common bus line in a planar view.

4. The display device according to claim 3, wherein the first common wiring portion is formed on a first insulating film covering the common bus line, the first common wiring portion being electrically connected to the common bus line through a contact hole formed on the first insulating film.

5. The display device according to claim 1, further comprising a connection wiring which extends in the first direction outside of the display region and overlaps the common bus line in a planar view, wherein
   the first common wiring portion overlaps the common bus line in a planar view,
   the first common wiring portion is formed on a first insulating film covering the common bus line,
   the connection wiring is formed on a second insulating film covering the first common wiring portion,
   the connection wiring is electrically connected to the common bus line through a first contact hole formed in the first insulating film and the second insulating film, the first insulating film and the second insulating film being located between the data line and the first common wiring portion adjacent to each other, and the connection wiring is electrically connected to the first common wiring portion through a second contact hole formed on the second insulating film, the second contact hole overlapping at least one of the both ends of the first common wiring portion, and
   the first common wiring portion and the common bus line are electrically connected to each other through the connection wiring.

6. The display device according to claim 1, wherein the common bus line is formed on the same layer as the plurality of gate lines.

7. The display device according to claim 1, wherein a width of the first common wiring portion in the first direction is larger than a width of each of the pixel regions in the first direction.

8. The display device according to claim 1, wherein a width of the first common wiring portion in the first direction is larger, as a distance from a feeding portion of the common voltage to the first common wiring portion is longer.

9. The display device according to claim 1, wherein one of the pixel regions is a region surrounded by the two gate lines adjacent to each other, and the data line and the common wiring which are adjacent to each other.

10. The display device according to claim 1, wherein:
    the data line or the common wiring is disposed between the two pixel regions adjacent to each other in the first direction, and the plurality of data lines and the plurality of common wirings are alternately disposed in the first direction; and
    the two gate lines are disposed between the two pixel regions which are adjacent to each other in the second direction.

* * * * *